Feb. 5, 1924.
B. E. HODGKIN
CUP
Filed May 10, 1923
1,482,561
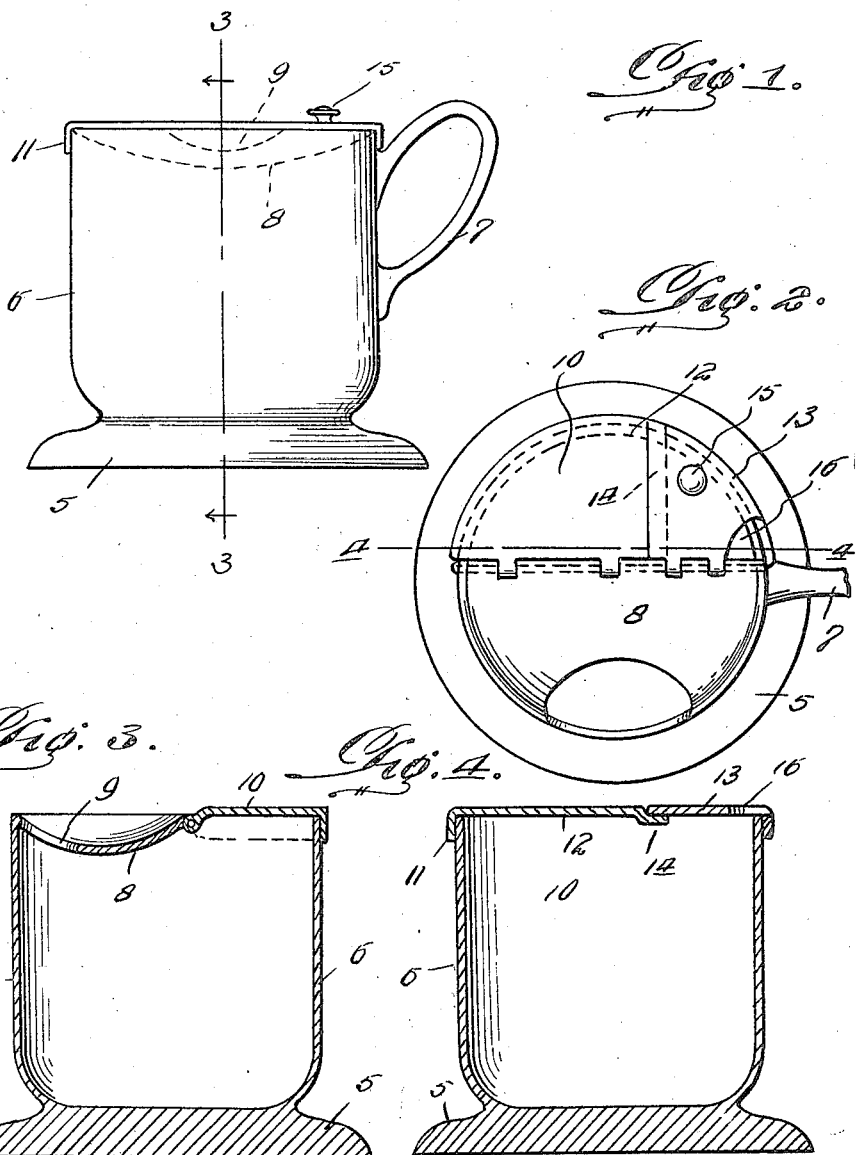

Patented Feb. 5, 1924.

1,482,561

UNITED STATES PATENT OFFICE.

BERTHA E. HODGKIN, OF RUSSELLVILLE, INDIANA.

CUP.

Application filed May 10, 1923. Serial No. 638,143.

*To all whom it may concern:*

Be it known that I, BERTHA E. HODGKIN, a citizen of the United States, residing at Russellville, in the county of Putman and State of Indiana, have invented certain new and useful Improvements in Cups, of which the following is a specification.

In carrying out the present invention, it is my purpose to provide a cup, wherein the upper end thereof is equipped with an inwardly extending guard, as well as a hinged cover associated with said guard for consequently lessening the liability of the fluid within the cup becoming spilled while stirring the same.

The primary object of this invention is the provision of such a cup that is extremely simple of construction, as well as being highly useful of purpose, the nature of the same being such as to permit of its manufacture and marketing at relatively small cost.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:

Figure 1 is a side elevation of my improved cup.

Figure 2 is a top plan view thereof.

Figure 3 is a detail vertical cross section upon the line 3—3 of Figure 1, and

Figure 4 is a cross section upon the line 4—4 of Figure 2.

Referring to the drawing in detail, my cup preferably embodies a circular base 5, a cylindrical receptacle portion 6, and a handle 7. The upper open end of the receptacle portion 6 is formed with an inwardly extending guard 8, which is substantially crescent shape, and covers about one-half of the opening of this receptacle portion. As more clearly shown in Figure 3, this crescent shape guard 8 is concaved, and is provided with a fluid outlet opening 9, whereby the material within the cup may be discharged into the mouth of the drinker.

Hingedly secured to the inner transverse edge of the guard 8 is a crescent shaped metallic lid 10, the circular edge of which is flanged at 11 for engagement over the upper edge of the receptacle portion 6. This lid 10 comprises a main section 12 and an auxiliary section 13, the edge of the section 12 adjacent the section 13 being formed with an extension 14 that receives the adjacent edge of the auxiliary section 13, when the same is closed in a manner more clearly shown in Figure 4.

The auxiliary section 13 is provided with a lifting knob 15, whereby this section may be raised for allowing sugar or cream to be placed within the cup. Further, this auxiliary section 13 is formed with a cut out 16, for permitting of the spoon handle to project therethrough, and for also permitting the fluid within the cup to be stirred, while the lid 10 is closed, which will preclude any liability of the fluid within the cup splashing over the sides thereof.

In view of the above description, it will at once be apparent that I have provided a highly novel form of cup, wherein the liability of the material therein splashing over the sides of the cup during the stirring of the fluid therein is reduced to a minimum, and although I have herein set forth the preferred embodiment of the invention, it is nevertheless to be understood that minor changes may be made therein, without departing from the spirit and scope of the invention as claimed.

Having thus described my invention, what I claim as new, and desire to secure by Letters-Patent, is:

In an article of the class described, a cup having a semi-circular wall formed at the upper edge thereof and closing a portion of the opening in the cup, said wall being provided in the central portion adjacent the edge of the cup with an outlet opening for fluid, a pair of cooperating cover sections hingedly connected with the semi-circular wall of said cup, said sections forming a semi-circular cover for the open portion of said cup, one of said sections having the adjacent edge of the other section offset for interfitting relation with the edge of said other section, and said other section being provided with a cut-away portion and a handle whereby said other section may be moved on its pivot independently of the first mentioned section.

In testimony whereof I affix my signature.

BERTHA E. HODGKIN.